(12) United States Patent
Toyora

(10) Patent No.: US 9,871,480 B2
(45) Date of Patent: Jan. 16, 2018

(54) POWER SUPPLY CONTROL APPARATUS, VEHICLE AND METHOD OF CONTROLLING POWER SUPPLY

(71) Applicant: TOYOTA JIDOSHA KABUSHIKI KAISHA, Toyota-shi, Aichi-ken (JP)

(72) Inventor: Sachio Toyora, Gotemba (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 11 days.

(21) Appl. No.: 15/226,235

(22) Filed: Aug. 2, 2016

(65) Prior Publication Data

US 2017/0093316 A1 Mar. 30, 2017

(30) Foreign Application Priority Data

Sep. 24, 2015 (JP) .................................. 2015-186813

(51) Int. Cl.
*H02P 9/10* (2006.01)
*B60L 1/00* (2006.01)

(52) U.S. Cl.
CPC ................. *H02P 9/10* (2013.01); *B60L 1/003* (2013.01)

(58) Field of Classification Search
CPC ....... B60L 1/003; B60W 10/08; B60W 20/00; H02P 9/10
USPC .......................................................... 322/37
See application file for complete search history.

(56) References Cited

U.S. PATENT DOCUMENTS

| | | | | | |
|---|---|---|---|---|---|
| 7,389,837 B2* | 6/2008 | Tamai | ....................... | B60L 1/00 | 180/65.21 |
| 2008/0234897 A1* | 9/2008 | Tsuchida | ............. | B60W 50/029 | 701/42 |
| 2010/0006360 A1* | 1/2010 | Kishimoto | ............... | B60K 6/34 | 180/65.285 |
| 2014/0042990 A1* | 2/2014 | Maruyama | .............. | H02P 9/102 | 322/28 |
| 2015/0015215 A1* | 1/2015 | Wu | ......................... | H02H 3/24 | 322/28 |
| 2017/0166081 A1* | 6/2017 | Kwon | ................. | B60L 11/1887 | |

FOREIGN PATENT DOCUMENTS

| | | |
|---|---|---|
| JP | 2010-083420 A | 4/2010 |
| JP | 2013-103514 A | 5/2013 |
| JP | 2013-103515 A | 5/2013 |
| JP | 2013-112098 A | 6/2013 |

* cited by examiner

*Primary Examiner* — Tulsidas C Patel
*Assistant Examiner* — Sean Gugger
(74) *Attorney, Agent, or Firm* — Sughrue Mion, PLLC

(57) ABSTRACT

If a total power consumption of the high- and low-voltage auxiliary machinery is greater than a first reference value when the high-voltage secondary battery is disconnected from the high-voltage wiring by the relay, the power supply control apparatus sets a lower value to a target control value of the generator output voltage, compared with the total power consumption is less than or equal to the first reference value. If the total power consumption of the high- and low-voltage auxiliary machinery is less than a second reference value that is less than or equal to the first reference value when the high-voltage secondary battery is disconnected from the high-voltage wiring by the relay, the power supply control apparatus sets a higher value to the target control value of the generator output voltage, compared with the total power consumption is more than or equal to the second reference value.

13 Claims, 6 Drawing Sheets

POWER SUPPLY CONTROL APPARATUS, VEHICLE AND METHOD OF CONTROLLING POWER SUPPLY

CROSS-REFERENCE TO RELATED APPLICATIONS

The present application claims priority from Japanese patent application No. 2015-186813 filed on Sep. 24, 2015, the disclosure of which is hereby incorporated by reference into this application in its entirety.

BACKGROUND

Field

The present disclosure relates to a power supply control apparatus, a vehicle and a method of controlling a power supply.

Related Art

JP 2013-103514A describes a hybrid vehicle configured to perform "batteryless drive control" to be driven in a state that a battery is disconnected from a motor and a generator in the case of a failure of the battery. The batteryless drive control causes the generator to generate electric power with feedback control of the throttle position of an engine to make the rotation speed of the engine approach to a target value, and drives the motor with the electric power generated by the generator, so as to drive the vehicle. JP 2013-103514A also discloses a technique of enhancing the responsiveness of the feedback control of the throttle position during batteryless drive control, in order to prevent the voltage of a power supply system from becoming unstable during high-speed drive.

The latest vehicle may be equipped with both high-voltage auxiliary machinery operated at high voltage and low-voltage auxiliary machinery operated at low voltage. When the power consumption of the high-voltage auxiliary machinery rapidly increases or decreases during batteryless drive control, the voltage of the high-voltage system is likely to be rapidly varied with this rapid increase or decrease of the power consumption and to deviate from its allowable range. The same applies when the power consumption of the low-voltage auxiliary machinery is rapidly varied. The technique of enhancing the responsiveness of the feedback control of the throttle position described in JP 2013-103514A fails to sufficiently reduce such a variation in the voltage of the high-voltage system. The voltage of the high-voltage system is thus likely to deviate from the allowable range. This problem is not limited to the hybrid vehicle but is commonly found in any vehicle having two power supply systems, i.e., a high-voltage system and a low-voltage system.

SUMMARY

The present disclosure is made in order to solve at least a part of the subject described above, and can be implemented in view of the following aspects.

(1) According to one aspect of the disclosure, there is provided a power supply control apparatus of a vehicle, the vehicle comprising an engine; a DC-DC converter connected between high-voltage wiring and low-voltage wiring; a generator connected with the high-voltage wiring and configured to generate electric power by utilizing rotation of the engine; a high-voltage secondary battery connected with the high-voltage wiring via a relay; high-voltage auxiliary machinery connected with the high-voltage wiring; a low-voltage secondary battery connected with the low-voltage wiring; and low-voltage auxiliary machinery connected with the low-voltage wiring. (i) In a first case where a total power consumption of the high-voltage auxiliary machinery and the low-voltage auxiliary machinery is greater than a first reference value in a state that the high-voltage secondary battery is disconnected from the high-voltage wiring by the relay, the power supply control apparatus then sets a lower value to a target control value of output voltage of the generator, compared with a case where the total power consumption is less than or equal to the first reference value; and (ii) in a second case where the total power consumption of the high-voltage auxiliary machinery and the low-voltage auxiliary machinery is less than a second reference value that is less than or equal to the first reference value in the state that the high-voltage secondary battery is disconnected from the high-voltage wiring by the relay, the power supply control apparatus then sets a higher value to the target control value of output voltage of the generator, compared with a case where the total power consumption is more than or equal to the second reference value.

In the state that the high-voltage secondary battery is disconnected from the high-voltage wiring by the relay, the high-voltage secondary battery does not serve as a buffer in response to a voltage variation. Accordingly the voltage of the high-voltage wiring increases in the case of a rapid decrease of the total power consumption of the high-voltage auxiliary machinery and the low-voltage auxiliary machinery, while decreasing in the case of a rapid increase of the total power consumption of the auxiliary machinery. In the first case where the total power consumption of the auxiliary machinery is greater than the first reference value, the power supply control apparatus of this aspect sets the lower value to the target control value of output voltage of the generator, compared with the case where the total power consumption of the auxiliary machinery is less than or equal to the first reference value. Eve when the voltage of the high-voltage wiring increases with a rapid decrease of the total power consumption of the auxiliary machinery, this configuration enables the voltage of the high-voltage wiring to be kept in an allowable range. In the second case where the total power consumption of the auxiliary machinery is less than the second reference value, on the other hand, the power supply control apparatus of this aspect sets the higher value to the target control value of output voltage of the generator, compared with the case where the total power consumption of the auxiliary machinery is more than oe equal to the second reference value. Even when the voltage of the high-voltage wiring decreases with a rapid increase of the total power consumption of the auxiliary machinery, this configuration enables the voltage of the high-voltage wiring to be kept in the allowable range.

(2) The fuel cell system in accordance with the aspect before, (iii) in a third case where the total power consumption of the high-voltage auxiliary machinery and the low-voltage auxiliary machinery is between the second reference value and the first reference value, inclusive, in the state that the high-voltage secondary battery is disconnected from the high-voltage wiring by the relay, the power supply control apparatus then may set a middle value between the lower value in the first case and the higher value in the second case to the target control value of output voltage of the generator.

In the third case, the power supply control apparatus of this aspect sets the middle value between the value in the first case and the value in the second case to the target control value of the output voltage of the generator. Even when the voltage of the high-voltage wiring is varied with a change in the total power consumption of the auxiliary machinery, this configuration enables the voltage of the high-voltage wiring to be kept in the allowable range.

(3) The fuel cell system in accordance with the aspect before, wherein (i) in the first case, the power supply control apparatus may further set a higher value to a target control value of voltage on a low-voltage wiring-side of the DC-DC converter, compared with the case where the total power consumption is less than or equal to the first reference value, and (ii) in the second case, the power supply control apparatus may further set a lower value to the target control value of voltage on the low-voltage wiring-side of the DC-DC converter, compared with the case where the total power consumption is more than or equal to the second reference value.

The DC-DC converter is configured to supply the electric power that is supplied to the high-voltage wiring, to the low-voltage auxiliary machinery. When the power consumption of the low-voltage auxiliary machinery decreases in the first case, the power supply from the DC-DC converter to the low-voltage wiring becomes excessive. The power supply control apparatus of this aspect, however, provides a relatively large value as the target control value of the voltage on the low-voltage wiring-side of the DC-DC converter. This enables the low-voltage secondary battery to be changed with surplus electric power passing through the DC-DC converter. As a result, even in the case of a variation in the voltage of the high-voltage wiring, this configuration enables the voltage of the high-voltage wiring to be kept in the allowable range. When the power consumption of the low-voltage auxiliary machinery increases in the second case, on the other hand, the power supply from the DC-DC converter to the low-voltage wiring becomes short. The power supply control apparatus of this aspect, however, provides a relatively small value as the target control value of the voltage on the low-voltage wiring-side of the DC-DC converter. This enables the insufficient electric power to be compensated by discharging the low-voltage secondary battery. As a result, even in the case of a variation in the voltage of the high-voltage wiring, this configuration enables the voltage of the high-voltage wiring to be kept in the allowable range.

(4) The fuel cell system in accordance with the aspect before, wherein (iii) in the third case, the power supply control apparatus may further set a middle value between the lower value in the first case and the higher value in the second case to the target control value of voltage on the low-voltage wiring-side of the DC-DC converter.

Even when the voltage of the high-voltage wiring is varied in the third case, the power supply control apparatus of this aspect enables the voltage of the high-voltage wiring to be readily kept in the allowable range.

(5) The fuel cell system in accordance with the aspect before,
wherein the high-voltage auxiliary machinery includes a first auxiliary machine that is used for braking control of the vehicle and a second auxiliary machine that is not used for the braking control,
when power consumption of the first auxiliary machine varies in the state that the high-voltage secondary battery is disconnected from the high-voltage wiring by the relay, the power supply control apparatus may change power consumption of the second auxiliary machine, in order to reduce a variation in sum of the power consumption of the first auxiliary machine and the power consumption of the second auxiliary machine.

Even when the power consumption of the first auxiliary machine is varied, this configuration provides a small variation of the sum of the power consumption of the first auxiliary machine and the power consumption of the second auxiliary machine. As a result, this configuration enables the voltage of the high-voltage auxiliary machinery to be kept in an allowable range even in the case of a variation of the power consumption of the first auxiliary machine.

The disclosure may be implemented by any of various aspects other than the power supply control apparatus, for example, a vehicle equipped with the power supply control apparatus or a method of controlling a power supply.

DESCRIPTION OF THE EMBODIMENTS

First Embodiment

Figure 1:
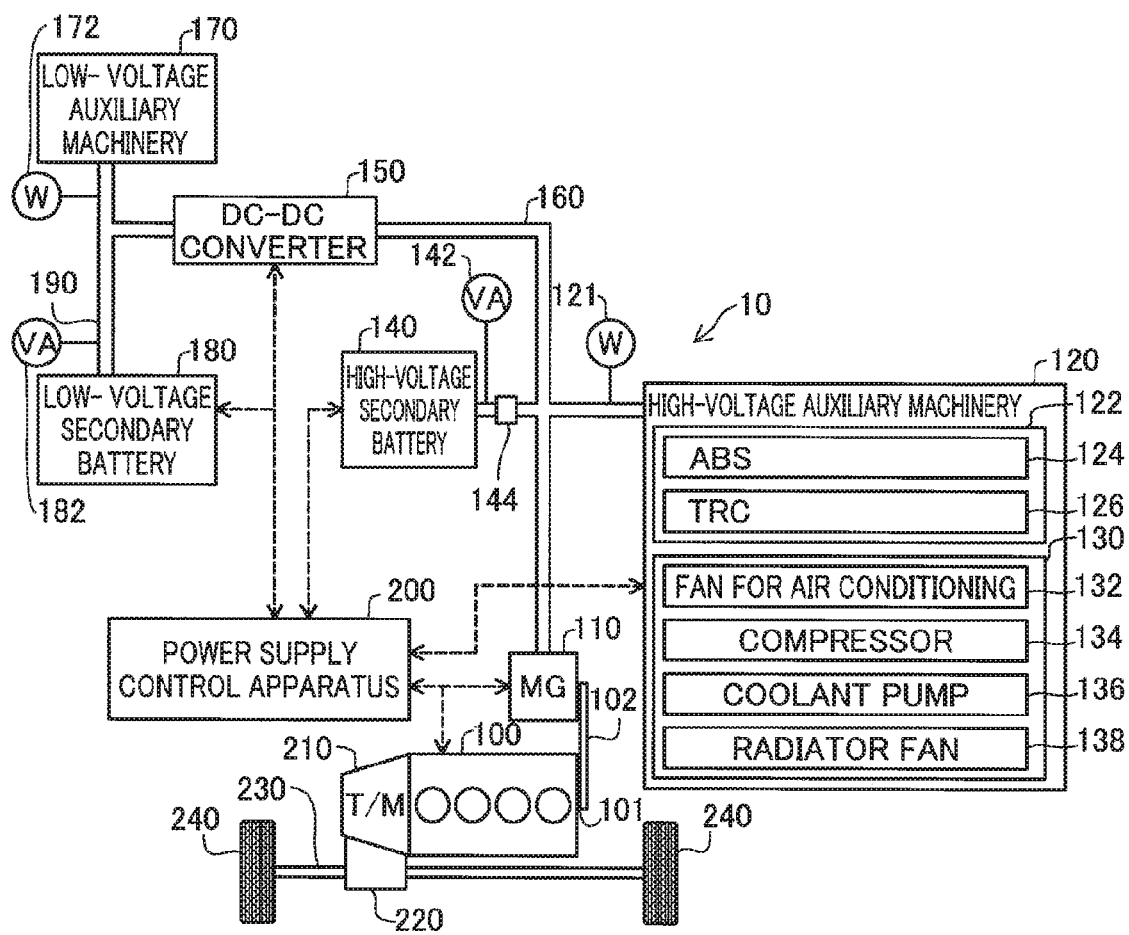
FIG. 1 is a diagram illustrating a vehicle according to a first embodiment.

FIG. 1 is a diagram illustrating a vehicle 10 according to a first embodiment. The vehicle 10 may include an engine 100, a generator 110, high-voltage auxiliary machinery 120, a high-voltage secondary battery 140, a battery sensor 142, a relay 144, a DC-DC converter 150, high-voltage wiring 160, low-voltage auxiliary machinery 170, a low-voltage secondary battery 180, low-voltage wiring 190, a power supply control apparatus 200, a transmission 210, a power distributor 220, a driveshaft 230 and drive wheels 240.

According to the first embodiment, the engine 100 used may be an internal combustion engine. The generator 110 is connected with a rotating shaft 101 of the engine 100 via a power transmission mechanism 102 such as a belt and a gear and is configured to generate electric power by utilizing rotation of the engine 100. The high-voltage auxiliary machinery 120 is auxiliary machines that are connected with the high-voltage wiring 160 and are operated at relatively high voltage. The high-voltage auxiliary machinery 120 is classified into first auxiliary machines 122 and second auxiliary machines 130. The first auxiliary machines 122 are auxiliary machines specifically involved in braking control or drive control of the vehicle in the high-voltage auxiliary machinery 120 and may include an anti-lock braking system 124 (hereinafter referred to as "ABS 124": "ABS" is registered trademark) and a traction control system 126 (hereinafter referred to as "TRC 126": "TRC" is registered trademark). The second auxiliary machines 130 are auxiliary machines not involved in braking control or drive control of the vehicle in the high-voltage auxiliary machinery 120 and may include, for example, a fan 132 for air conditioning, a compressor 134 for air conditioning, a coolant pump 136 of the engine 100 and a radiator fan 138. The low-voltage auxiliary machinery 170 is auxiliary machines that are connected with the low-voltage wiring 190 and are operated at relatively low voltage. The low-voltage auxiliary machinery 170 may include, for example, audio equipment including a radio and a stereo set and an interior light (not shown). The high-voltage auxiliary machinery 120 and the low-voltage auxiliary machinery 170 are distinguished from each other by only the connection with the high-voltage wiring 160 or the low-voltage wiring 190. For example, the vehicle 10 may be provided with the coolant pump 136 of the engine 100 and the radiator fan 138 that are connected as the low-voltage auxiliary machinery 170 with the low-voltage wiring 190 or may be provided with the audio equipment including the radio and the stereo set that are connected as the high-voltage auxiliary machinery 120 with the high-voltage wiring 160. The first auxiliary machines 122 such as the ABS 124 and the TRC 126 have large power consumption during operation and may thus be desirably connected as the high-voltage auxiliary machinery 120 with the high-voltage wiring 160. The high-voltage auxiliary machinery 120 may be equipped with a wattmeter 121 configured to measure the power consumption of the high-voltage auxiliary machinery 120. The low-voltage auxiliary machinery 170 may be similarly equipped with a wattmeter 172 configured to measure the power consumption of the low-voltage auxiliary machinery 170.

The high-voltage secondary battery 140 may be a secondary battery having a nominal voltage of, for example, 48 V. The low-voltage secondary battery 180 may be a secondary battery having a nominal voltage of, for example, 12 V. The voltage of the high-voltage secondary battery 140 and the voltage of the low-voltage secondary battery 180 are, however, not respectively limited to 48 V and 12 V. The vehicle 10 may thus be equipped with two different types of secondary batteries 140 and 180 having different voltages. The secondary battery having the relatively higher voltage is expressed as the high-voltage secondary battery 140, and the secondary battery having the relatively lower voltage is expressed as the low-voltage secondary battery 180. The high-voltage secondary battery 140 is connected with the generator 110 and the high-voltage auxiliary machinery 120 via the high-voltage wiring 160. The high-voltage secondary battery 140 may thus accumulate electric power generated by the generator 110. The electric power accumulated in the high-voltage secondary battery 140 may be used to operate the high-voltage auxiliary machinery 120. The low-voltage secondary battery 180 is connected with the low-voltage wiring 190 and is further connected with the DC-DC converter 150 and the low-voltage auxiliary machinery 170. The low-voltage secondary battery 180 may thus accumulate electric power supplied via the DC-DC converter 150. The electric power accumulated in the low-voltage secondary battery 180 may be used to operate the low-voltage auxiliary machinery 170. The battery sensor 142 is configured to detect an output voltage and an output current of the high-voltage secondary battery 140. The relay 144 may be a relay switch configured to disconnect the high-voltage secondary battery 140 from the high-voltage wiring 160. A battery sensor 182 is configured to detect an output voltage and an output current of the low-voltage secondary battery 180.

The DC-DC converter 150 is connected with the high-voltage wiring 160 and the low-voltage wiring 190. As a result, the DC-DC converter 150 is connected with the generator 110, the high-voltage auxiliary machinery 120 and the high-voltage secondary battery 140 via the high-voltage wiring 160, while being connected with the low-voltage auxiliary machinery 170 and the low-voltage secondary battery 180 via the low-voltage wiring 190. The DC-DC converter 150 is configured to convert the power between the high-voltage wiring 160 and the low-voltage wiring 190. In the case of surplus of electric power on the high-voltage side or in the case of shortage of electric power on the low-voltage side, the DC-DC converter 150 supplies electric power from the high-voltage side to the low-voltage side, in response to an instruction from the power supply control apparatus 200. In the case of surplus of electric power on the low-voltage side or in the case of shortage of electric power on the high-voltage side, on the other hand, the DC-DC converter 150 supplies electric power from the low-voltage side to the high-voltage side, in response to an instruction from the power supply control apparatus 200.

The power supply control apparatus 200 is configured to control the rotation speed of the engine 100, the output voltage of the generator 110 and the voltage conversion of the DC-DC converter 150, based on the power consumption of the high-voltage auxiliary machinery 120, the power consumption of the low-voltage auxiliary machinery 170, the SOC (state of charge) of the high-voltage secondary battery 140 and the SOC of the low-voltage secondary battery 180. The SOC of the high-voltage secondary battery 140 may be obtained by using the battery sensor 142. The SOC of the low-voltage secondary battery 180 may be obtained by using the battery sensor 182. The power supply control apparatus 200 is also configured to control the voltage of the high-voltage wiring 160 in an allowable range. This control will be described later.

The transmission 210 is configured to change the speed of rotation of the rotating shaft 101 of the engine 100 and transmit the changed speed to the power distributor 220. The power distributor 220 is configured to distribute the driving force supplied from the engine 100 into the left and right drive wheels 240. The driveshaft 230 is configured to transmit the driving force distributed by the power distributor 220 to the drive wheels 240.

Figure 2:
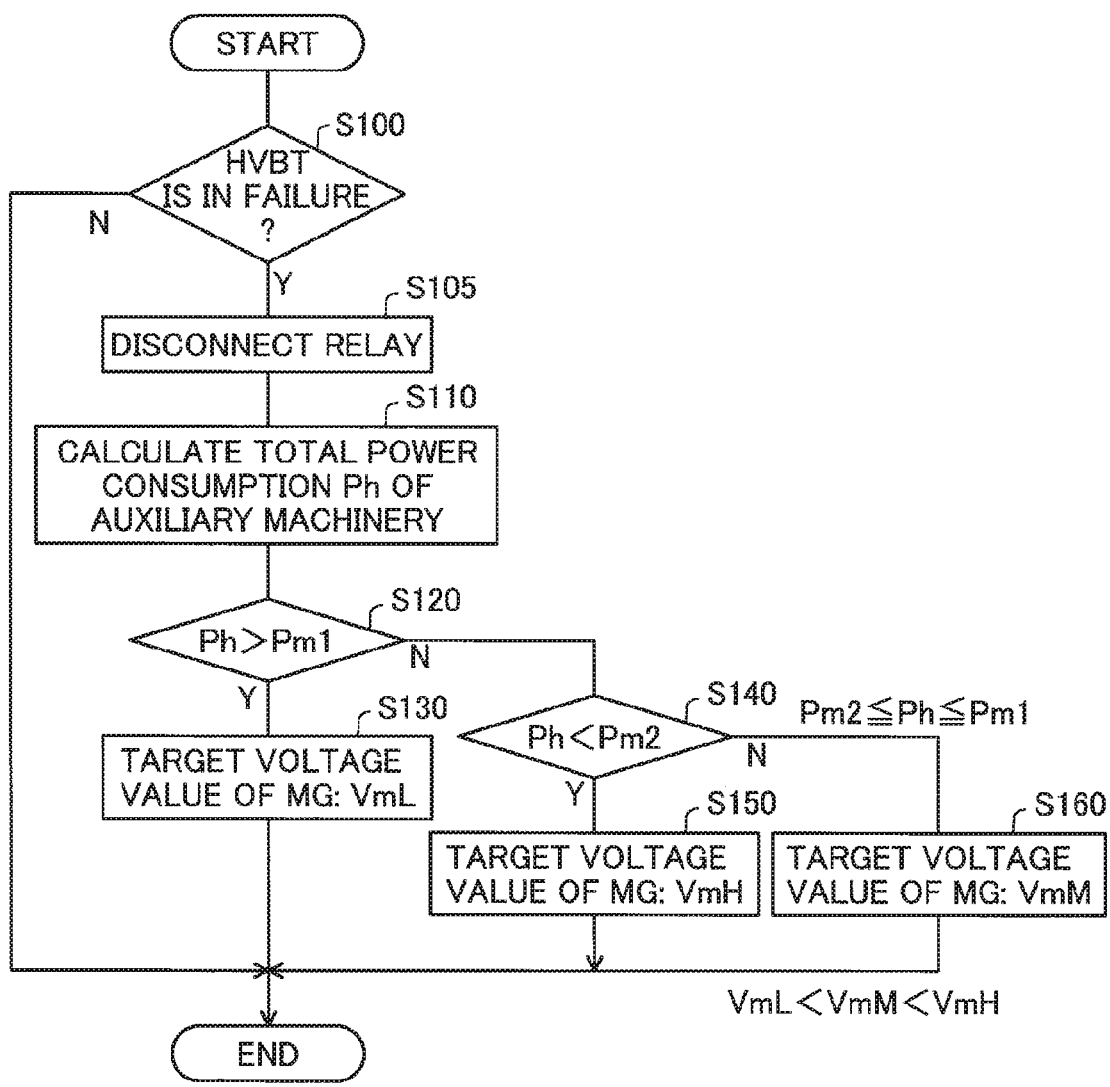
FIG. 2 is a control flowchart according to the first embodiment.

FIG. 2 is a control flowchart according to the first embodiment. At step S100, the power supply control apparatus 200 refers to the measurement result of the battery sensor 142 and determines whether the high-voltage secondary battery 140 (shown as "HVBT" in FIG. 2) is in failure. The "failure" herein denotes a state that fails to take out electric power from the high-voltage secondary battery 140 or fails to charge the high-voltage secondary battery 140 with electric power and may include, for example, the case where the high-voltage secondary battery 140 itself is at fault and the case where the high-voltage secondary battery 140 is disconnected from the high-voltage wiring 160. When the high-voltage secondary battery 140 is not in failure, the power supply control apparatus 200 terminates the series of processing according to this flowchart and controls the rotation speed of the engine 100, the output voltage of the generator 110 and the voltage conversion of the DC-DC converter 150, based on the power consumption of the high-voltage auxiliary machinery 120, the power consumption of the low-voltage auxiliary machinery 170, the SOC (state of charge) of the high-voltage secondary battery 140 and the SOC of the low-voltage secondary battery 180 (ordinary control) as described above. When the high-voltage secondary battery 140 is in failure, on the other hand, the power supply control apparatus 200 uses the relay 144 to disconnect the high-voltage secondary battery 140 from the high-voltage wiring 160 at step S105 and shifts to step S110.

At step S110, the power supply control apparatus 200 calculates a total power consumption Ph as the sum of the power consumption of the high-voltage auxiliary machinery 120 and the power consumption of the low-voltage auxiliary machinery 170. When electric power is supplied from the DC-DC converter 150 to the low-voltage auxiliary machinery 170, it may be assumed that the electric power passing through the DC-DC converter 150 is approximately equal to the power consumption of the low-voltage auxiliary machinery 170 without taking into account the charge-discharge electric power of the low-voltage secondary battery 180. The power supply control apparatus 200 may thus calculate the total power consumption Ph from the electric power passing through the DC-DC converter 150, in place of the power consumption of the low-voltage auxiliary machinery 170.

The power supply control apparatus 200 controls the rotation speed of the engine 100 and the output voltage of the generator 110, in order to allow an amount of electric power equal to the total power consumption Ph to be generated even in the case where the high-voltage secondary battery 140 is in failure. More specifically, in the case of a variation in power consumption of the high-voltage auxiliary machinery 120, the power supply control apparatus 200 performs feedback control of the output power of the generator 110 to follow the variation. The generator 110 is, however, configured to generate electric power using the rotation of the engine 100. There may thus be a time lag, for example, between an increase in power consumption of the high-voltage auxiliary machinery 120 and an increase in output power of the generator 110. As a result, this is likely to cause the voltage of the high-voltage wiring 160 to be deviated from its allowable range. More specifically, in the case of a rapid increase in power consumption of the high-voltage auxiliary machinery 120, the voltage of the high-voltage wiring 160 is likely to decrease below a lower limit of the allowable range until the output power of the generator 110 is increased. Decreasing the voltage of the high-voltage wiring 160 below the lower limit of the allowable range is likely to cause abnormal operation of the high-voltage auxiliary machinery 120. In the case of a rapid decrease in power consumption of the high-voltage auxiliary machinery 120, on the contrary, the voltage of the high-voltage wiring 160 is likely to increase over an upper limit of the allowable range. Increasing the voltage of the high-voltage wiring 160 over the upper limit of the allowable range is likely to cause a failure of the high-voltage auxiliary machinery 120.

At step S120, the power supply control apparatus 200 determines whether the total power consumption Ph of the auxiliary machinery satisfies a first condition that the total power consumption Ph is greater than a first reference value Pm1 (i.e., whether the total power consumption Ph corresponds to a first case). In the case of Ph>Pm1, the power supply control apparatus 200 proceeds to step S130. In the case of Ph≤Pm1, on the other hand, the power supply control apparatus 200 proceeds to step S140.

At step S140, the power supply control apparatus 200 determines whether the total power consumption Ph of the auxiliary machinery satisfies a second condition that the total power consumption Ph is less than a second reference value Pm2 (i.e., whether the total power consumption Ph corresponds to a second case). The second reference value Pm2 is set in advance to a value that is equal to or less than the first reference value Pm1. According to this embodiment, Pm2<Pm1. In the case of Ph<Pm2, the power supply control apparatus 200 proceeds to step S150. In the case of Pm2≤Ph, on the other hand, the power supply control apparatus 200 proceeds to step S160. Step S160 corresponds to a third case.

At steps S130, S150 and S160, a target control value of the output voltage of the generator 110 is set to one of three values VmL, VmM and VmH. These three values satisfy a relationship of VmL<VmM<VmH. At step S160, the power supply control apparatus 200 sets the target control value of the output voltage of the generator 110 to VmM and causes an amount of electric power equal to the total power consumption Ph of the auxiliary machinery to be generated. This target control value VmM is a value close to a median of the allowable range of the voltage of the high-voltage wiring 160.

At step S130, the power supply control apparatus 200 sets the target control value of the output voltage of the generator 110 to VmL. This first case sets the lower target control value of the output voltage of the generator 110, compared with the case where the total power consumption Ph of the auxiliary machinery is equal to or less than the first reference value Pm1 (steps S160 and S150).

At step S150, the power supply control apparatus 200 sets the target control value of the output voltage of the generator 110 to VmH. This second case sets the higher target control value of the output voltage of the generator 110, compared with the case where the total power consumption Ph of the auxiliary machinery is equal to or greater than the second reference value Pm2 (steps S130 and S160).

Figure 3:
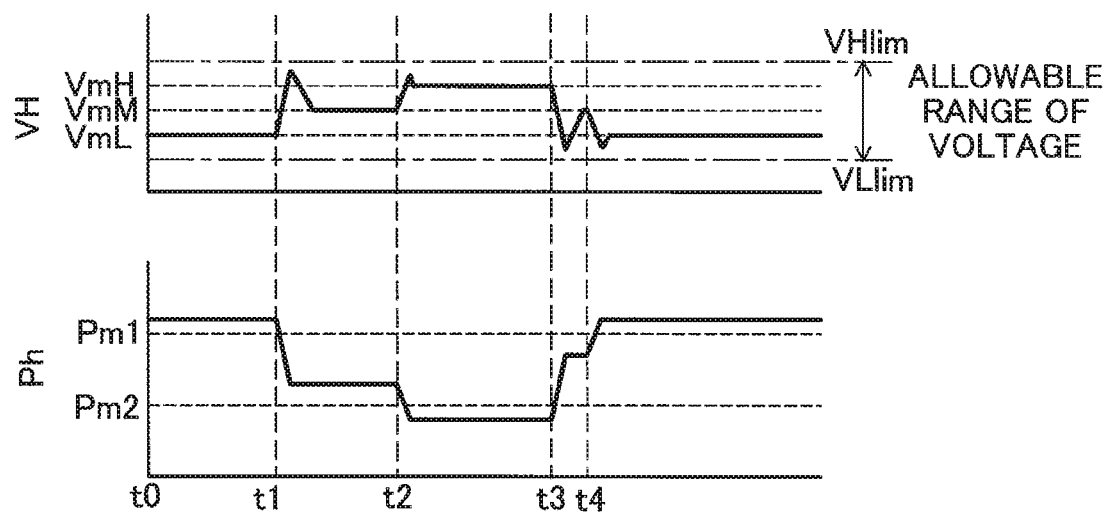
FIG. 3 is a diagram illustrating an example of changes in total power consumption of the auxiliary machinery and voltage VH of the high-voltage wiring according to the first embodiment.

FIG. 3 is a diagram illustrating an example of changes in total power consumption Ph of the auxiliary machinery and voltage VH of the high-voltage wiring 160 according to the first embodiment. In this example, the total power consumption Ph of the auxiliary machinery changes as described below, and the processing of respective steps shown in parentheses is performed:

(1) time period t0 to t1: Ph>Pm1 (step S130);
(2) time period t1 to t2: Pm2≤Ph≤Pm1 (step S160);
(3) time period t2 to t3: Ph<Pm2 (step S150);
(4) time period t3 to t4: Pm2≤Ph≤Pm1 (step S160); and
(5) time period after t4: Ph>Pm1 (step S130).

As understood from a change in voltage VH of the high-voltage wiring 160 shown in the upper part of FIG. 3, the target control value of the output voltage of the generator 110 is set to one of the three values VmL, VmM and VmL according to the total power consumption Ph of the auxiliary machinery, and feedback control is performed. Even in the case of a rapid decrease or a rapid increase of the total power consumption Ph of the auxiliary machinery, this configuration enables the voltage VH of the high-voltage wiring 160 to be kept in its allowable range (VHlim to VLlim).

Figure 4:
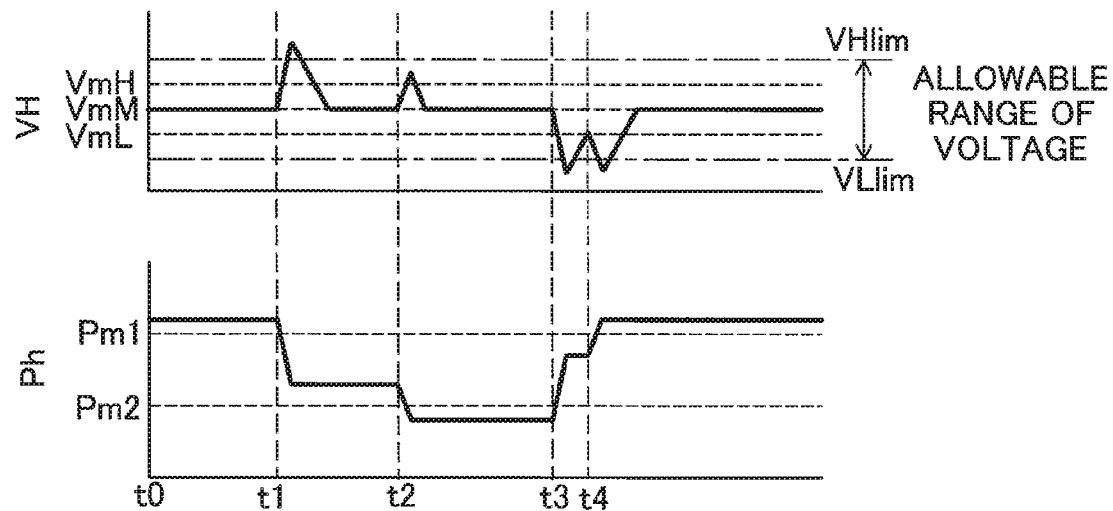
FIG. 4 is a diagram illustrating a comparative example of changes in total power consumption of the auxiliary machinery and voltage VH of the high-voltage wiring

FIG. 4 is a diagram illustrating a comparative example of changes in total power consumption Ph of the auxiliary machinery and voltage VH of the high-voltage wiring 160. In this comparative example, the target control value of the voltage VH of the high-voltage wiring 160 is equal to VmM irrespective of the total power consumption Ph of the auxiliary machinery. Accordingly, in the case of a rapid change in the total power consumption Ph of the auxiliary machinery, the voltage VH of the high-voltage wiring 160 is likely to increase over the upper limit VHlim of the allowable range or decrease below the lower limit VLlim.

As described above, according to the first embodiment, in the first case where the high-voltage secondary battery 140 is disconnected from the high-voltage wiring 160 by the relay 144 and Ph>Pm1 is satisfied, the power supply control apparatus 200 sets the target control value of the output voltage of the generator 110 to the lower value VmL compared with the case of Ph≤Pm1. In the second case where the high-voltage secondary battery 140 is disconnected from the high-voltage wiring 160 by the relay 144 and Ph≤Pm2 is satisfied, the power supply control apparatus 20 sets the target control value of the output voltage of the generator 110 to the higher voltage VmH, compared with the case of Ph≥Pm2. As a result, this can reduce the likelihood that the voltage VH of the high-voltage wiring 160 deviates from the allowable range (VLlim to VHlim) even in the case of a variation in the total power consumption Ph of the auxiliary machinery.

In the third case where the high-voltage secondary battery 140 is disconnected from the high-voltage wiring 160 by the relay 144 and Pm2≤Ph≤Pm1 is satisfied, the power supply control apparatus 200 sets the target control value of the output voltage of the generator 110 to the middle value VmM between the value VmL in the first case and the value VmH in the second case. In this third case, even when the voltage VH of the high-voltage wiring 160 is varied with a change in the total power consumption Ph of the auxiliary machinery, the voltage VH of the high-voltage wiring 160 is unlikely to deviate from the allowable range but is likely to be kept in the allowable range.

Although Pm2<Pm1 according to the above embodiment, Pm1 may be set equal to Pm2 (Pm1=Pm2). In the latter case, the processing of step S160 is unrequired. In this case, the determination of step S120 may be changed to whether Ph≥Pm1 is satisfied, in order to perform step S130 in the case of Ph=Pm1=Pm2. Alternatively the determination of step S140 may be changed to whether Ph≤Pm2 is satisfied, in order to perform step S150 in the case of Ph=Pm1=Pm2. The same applies to a second embodiment described below.

Second Embodiment

Figure 5:
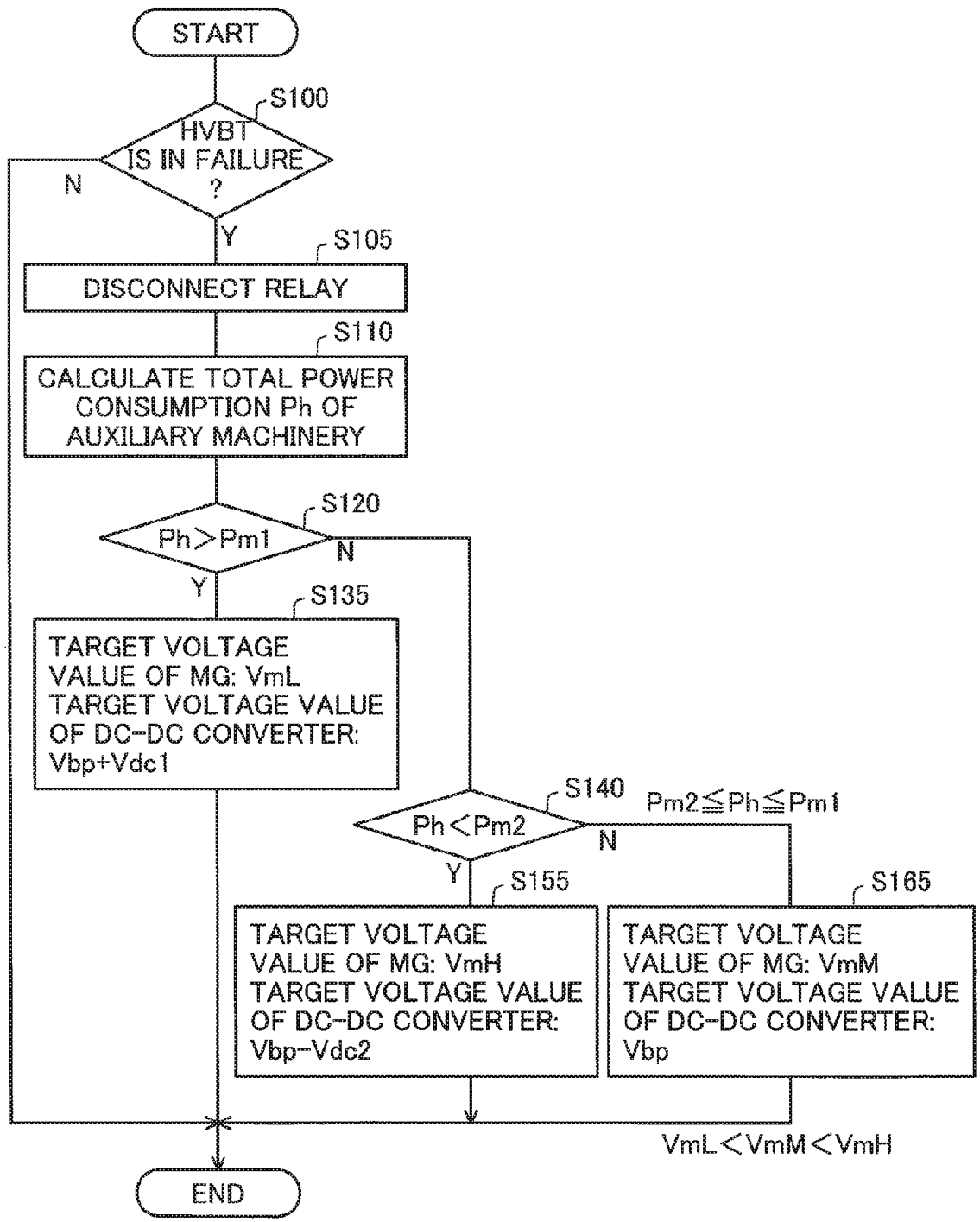
FIG. 5 is a control flowchart according to a second embodiment.

FIG. 5 is a control flowchart according to a second embodiment. The flowchart of the second embodiment differs from the flowchart of the first embodiment shown in FIG. 2 by the operations of steps S135, S155 and S165, but has the same operations at the other steps as those of the first embodiment. At step S165, the power supply control apparatus 200 sets a target control value of the voltage on the low-voltage wiring 190-side of the DC-DC converter 150 to a predetermined value Vpb, in addition to the processing of step S160 shown in FIG. 2. This target control value Vpb may be set, for example, equal to an open voltage of the low-voltage secondary battery 180. At step S135, the power supply control apparatus 200 sets the target control value of the voltage on the low-voltage wiring 190-side of the DC-DC converter 150 to a value (Vbp+Vdc1) that is larger than Vpb, in addition to the processing of step S130. Vdc1 is determined such that the value (Vbp+Vdc1) becomes equal to or less than an upper limit of an allowable voltage range of the low-voltage secondary battery 180. At step S155, the power supply control apparatus 200 sets the target control value of the voltage on the low-voltage wiring 190-side of the DC-DC converter 150 to a value (Vpb−Vdc2) that is smaller than Vpb, in addition to the processing of step S150. Vdc2 is determined such that the value (Vpb−Vdc2) becomes equal to or greater than a lower limit of the allowable voltage range of the low-voltage secondary battery 180.

According to the second embodiment, in the first case where the high-voltage secondary battery 140 is disconnected from the high-voltage wiring 160 by the relay 144 and Ph>Pm1 is satisfied, the power supply control apparatus 200 sets the target control value of the voltage on the low-voltage wiring 190-side of the DC-DC converter 150 to the larger value (Vpb+Vdc1), compared with the case of Pm1≥Ph. In this state, when the power consumption of the low-voltage auxiliary machinery 170 decreases, the power supply from the DC-DC converter 150 to the low-voltage wiring 190 becomes excessive. The target control value of the voltage on the low-voltage wiring 190-side of the DC-DC converter 150 is, however, set to the larger value (Vpb+Vdc1), so that the low-voltage secondary battery 180 can be charged with this surplus power. As a result, this configuration enables the voltage VH of the high-voltage wiring 160 to be readily kept in the allowable range even in the case where the power consumption of the low-voltage auxiliary machinery 170 decreases.

In the second case where the high-voltage secondary battery 140 is disconnected from the high-voltage wiring 160 by the relay 144 and Ph<Pm2 is satisfied, on the other hand, the power supply control apparatus 200 sets the target control value of the voltage on the low-voltage wiring 190-side of the DC-DC converter 150 to the smaller value (Vpb−Vdc2), compared with the case of Ph≥Pm2. In this state, when the power consumption of the low-voltage auxiliary machinery 170 increases, the power supply from the DC-DC converter 150 to the low-voltage wiring 190 becomes short. The target control value of the voltage on the low-voltage wiring 190-side of the DC-DC converter 150 is, however, set to the smaller value (Vpb−Vdc2), so that the insufficient power can be compensated by discharging the low-voltage secondary battery 180. As a result, this configuration enables the voltage VH of the high-voltage wiring 160 to be readily kept in the allowable range even in the case where the power consumption of the low-voltage auxiliary machinery 170 increases.

Third Embodiment

Figure 6:
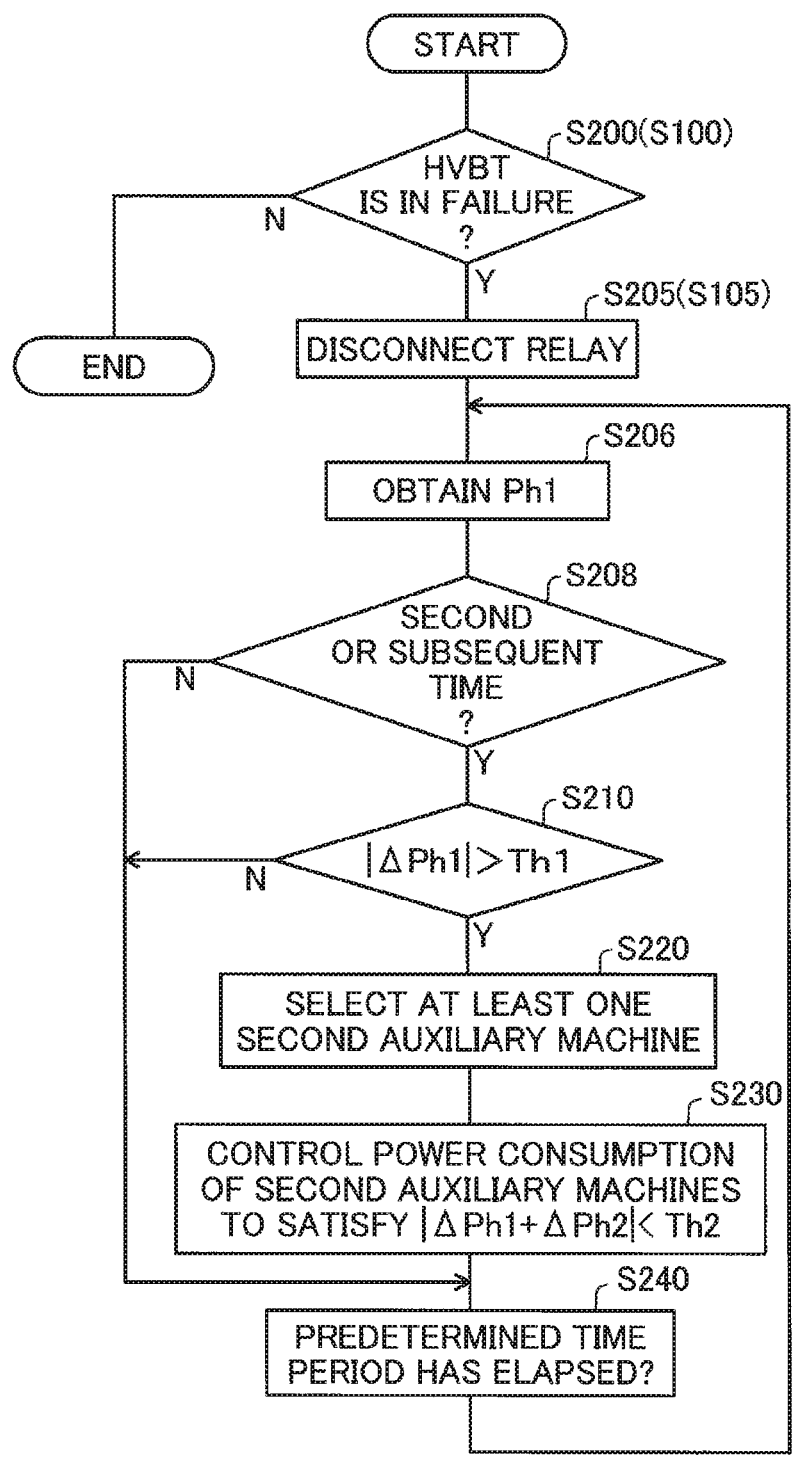
FIG. 6 is a control flowchart according to a third embodiment.

FIG. 6 is a control flowchart according to a third embodiment. The control process of the third embodiment may be performed in parallel to the control process of the first embodiment shown in FIG. 2 or in parallel to the control process of the second embodiment shown in FIG. 5. At steps S200 and S205, the power supply control apparatus 200 disconnects the high-voltage secondary battery 140 from the high-voltage wiring 160 by the relay 144 in the case where the high-voltage secondary battery 140 is in failure, like steps S100 and S105 of the first embodiment. At step S206, the power supply control apparatus 200 obtains power consumption Ph1 of the first auxiliary machines 122 (shown in FIG. 1) in the high-voltage auxiliary machinery 120. According to the third embodiment, two wattmeters, i.e., a first wattmeter configured to measure the power consumption of the first auxiliary machines 122 and a second wattmeter configured to measure the power consumption of the second auxiliary machines 130, may be desirably provided as the wattmeter 121 for the high-voltage auxiliary machinery 120. At step S208, the power supply control apparatus 200 determines whether execution of the routine of and after step S206 is the second or subsequent time. When execution of the routine of and after step S206 is the first time, the power supply controller 200 skips steps S210, S220 and S230 and proceeds to step S240. When execution of the routine of an after step S206 is the second or subsequent time, on the other hand, the power supply control apparatus 200 proceeds to step S210. At step S210, the power supply control apparatus 200 determines whether the absolute value of a difference |ΔPh1| between a previous value and a current value of the power consumption Ph1 of the first auxiliary machines 122 is greater than a predetermined reference value Th1. In the case of |ΔPh1|>Th1, the power supply control apparatus 200 proceeds to step S220. In the case of |ΔPh1|≤Th1, on the other hand, the power supply control apparatus 200 proceeds to step S240. The power supply control apparatus 200 waits for elapse of a predetermined time period at step S240 and returns to step S206.

At step S220, the power supply control apparatus 200 selects an auxiliary machine as a target for forcibly changing the power consumption among the second auxiliary machines 130 (shown in FIG. 1). The second auxiliary machines 130 are auxiliary machines not involved in braking control or drive control of the vehicle in the high-voltage auxiliary machinery 120 and may include, for example, the fan 132 for air conditioning, the compressor 134 for air conditioning, the coolant pump 136 of the engine 100 and the radiator fan 138, as described above. In the case where the power consumption of the first auxiliary machines 122 increases, the power supply control apparatus 200 may desirably select at least one of second auxiliary machines that have large power consumption at the moment among the second auxiliary machines 130. For example, when the fan 132 for air conditioning and the compressor 134 for air conditioning have large power consumption at the moment, the power supply control apparatus 200 may select either one of or both of the fan 132 for air conditioning and the compressor 134 for air conditioning. In the case where the power consumption of the first auxiliary machines 122 decreases, on the other hand, the power supply control apparatus 200 may desirably select at least one of second auxiliary machines that have small power consumption at the moment or that do not operate and have no power consumption among the second auxiliary machines 130. For example, when the coolant pump 136 of the engine 100 and the radiator fan 138 have small power consumption at the moment, the power supply control apparatus 200 may select either one or both of the coolant pump 136 of the engine 100 and the radiator fan 138. The levels of power consumption at the moment described above are only illustrative. According to the conditions of the vehicle 10, the coolant pump 136 of the engine 100 and the radiator fan 138 may have large power consumption, and the fan 132 for air conditioning and the compressor 134 for air conditioning may have small power consumption.

At step S230, the power supply control apparatus 200 controls the power consumption Ph2 of the second auxiliary machines 130 to satisfy |ΔPh1+ΔPh2|<Th2. ΔPh2 denotes a value showing how much the power consumption Ph2 of the second auxiliary machines 130 is to be changed. Th2 denotes a reference value set to a smaller value than the reference value Th1 at step S210. It is assumed that the plus sign indicates increasing the power consumption and the minus sign indicates decreasing the power consumption. In order to satisfy the above inequality, ΔPh2<0 should be satisfied in the case of increase in the power consumption Ph1 of the first auxiliary machines 122 (ΔPh1>0) and ΔPh2>0 should be satisfied in the case of decrease in the power consumption Ph1 of the first auxiliary machines 122 (ΔPh1<0). The power supply control apparatus 200 may desirably set ΔPh2 to satisfy |ΔPh2|≤|ΔPh1|. This is attributed to no need to change the power consumption Ph2 of the second auxiliary machines 130 over the change of the power consumption Ph1 of the first auxiliary machines 122. As described above, in the case where the high-voltage secondary battery 140 is disconnected from the high-voltage wiring 160 by the relay 144 and the power consumption Ph1 of the first auxiliary machines 122 increases, the power supply control apparatus 200 changes the power consumption Ph2 of the second auxiliary machines 130 to decrease the power consumption Ph2 of the second auxiliary machines 130. In the case where the high-voltage secondary battery 140 is disconnected from the high-voltage wiring 160 by the relay 144 and the power consumption Ph1 of the first auxiliary machines 122 decreases, on the other hand, the power supply control apparatus 200 changes the power consumption Ph2 of the second auxiliary machines 130 to increase the power consumption Ph2 of the second auxiliary machines 130. In this manner, the power supply control apparatus 200 changes the power consumption Ph2 of the second auxiliary machines 130, in order to reduce a variation in sum of the power consumption Ph1 of the first auxiliary machines 122 and the power consumption Ph2 of the second auxiliary machines 130.

Figure 7:
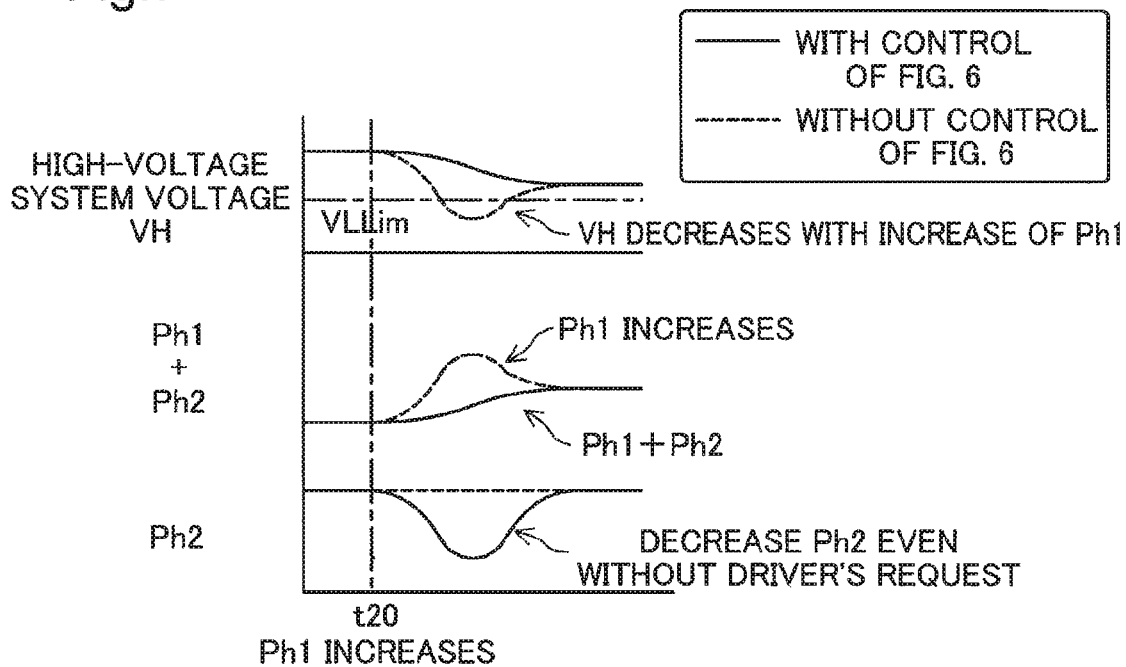
FIG. 7 is a diagram illustrating an example of changes of voltage and power consumption with an increase in the power consumption of the first auxiliary machines according to the third embodiment.

FIG. 7 is a diagram illustrating an example of changes of voltage and power consumption with an increase in the power consumption Ph1 of the first auxiliary machines 122 according to the third embodiment. It is assumed that the power consumption Ph1 of the first auxiliary machines 122 increases at a time t20. If the power supply control apparatus 200 does not perform the control of FIG. 6 and does not change the power consumption Ph2 of the second auxiliary machines 130, the voltage VH of the high-voltage wiring 160 is likely to decrease below the lower limit (VLlim) of the allowable range unless the output power of the generator 110 is increased with an increase in the power consumption Ph1 of the first auxiliary machines 122.

In the case of increase in the power consumption Ph1 of the first auxiliary machine 122, the power supply control apparatus 200 may, however, perform the control of FIG. 6 and change the power consumption Ph2 of the second auxiliary machines 130 to decrease the power consumption Ph2 of the second auxiliary machines 130. In this case, the sum of the power consumption Ph1 of the first auxiliary machines 122 and the power consumption Ph2 of the second auxiliary machines 130 increases at a slower rate, compared with the case where the power consumption Ph2 of the second auxiliary machines 130 is not changed. This accordingly enables the output power of the generator 110 to follow the sum of the power consumption Ph1 of the first auxiliary machines 122 and the power consumption Ph2 of the second auxiliary machines 130. As a result, this configuration increases the likelihood that the voltage VH of the high-voltage wiring 160 does not decrease below the lower limit (VLlim) of the allowable range.

Figure 8:
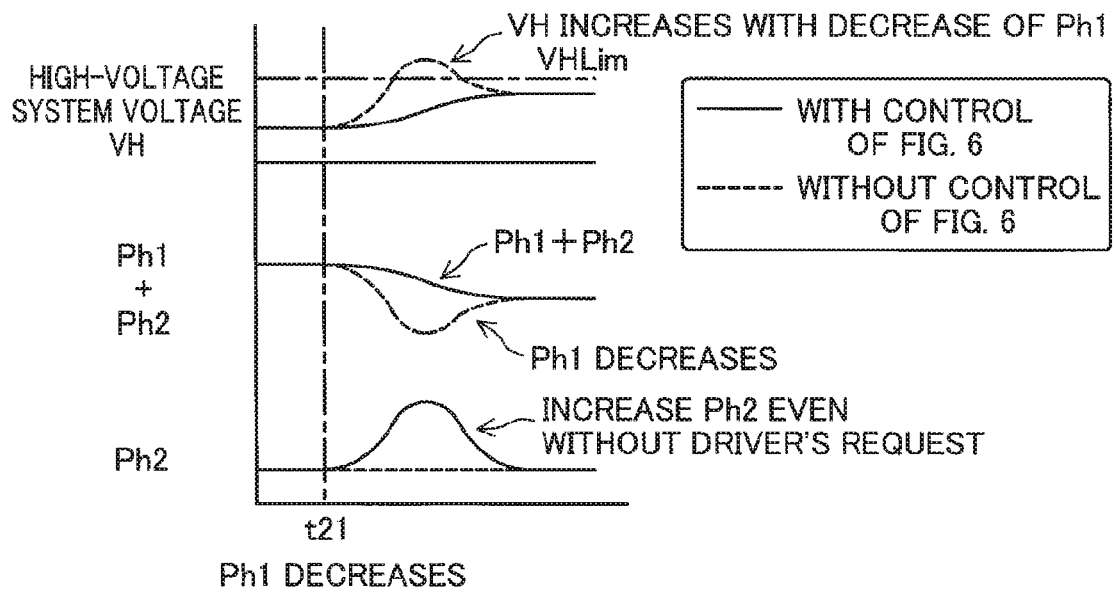
FIG. 8 is a diagram illustrating an example of changes of voltage and power consumption with a decrease in the power consumption of the first auxiliary machines according to the third embodiment.

FIG. 8 is a diagram illustrating an example of changes of voltage and power consumption with a decrease in the power consumption Ph1 of the first auxiliary machines 122 according to the third embodiment. It is assumed that the power consumption Ph1 of the first auxiliary machines 122 decreases at a time t21. If the power supply control apparatus 200 does not perform the control of FIG. 6 and does not change the power consumption Ph2 of the second auxiliary machines 130, the voltage VH of the high-voltage wiring 160 is likely to increase above the upper limit (VHlim) of the allowable range unless the output power of the generator 110 is decreased with a decrease in the power consumption Ph1 of the first auxiliary machines 122.

In the case of decrease in the power consumption Ph1 of the first auxiliary machines 122, the power supply control apparatus 200 may, however, perform the control of FIG. 6 and change the power consumption Ph2 of the second auxiliary machines 130 to increase the power consumption Ph2 of the second auxiliary machines 130. In this case, the sum of the power consumption Ph1 of the first auxiliary machines 122 and the power consumption Ph2 of the second auxiliary machines 130 decreases at a slower rate, compared with the case where the power consumption Ph2 of the second auxiliary machines 130 is not changed. This accordingly enables the output power of the generator 110 to follow the sum of the power consumption Ph1 of the first auxiliary machines 122 and the power consumption Ph2 of the second auxiliary machines 130. As a result, this configuration increases the likelihood that the voltage VH of the high-voltage wiring 160 does not increase over the upper limit (VHlim) of the allowable range as shown by a solid-line graph.

The power supply control apparatus 200 may desirably select at least one second auxiliary machine 130 that is unlikely to provide a feeling of strangeness to the driver even in the case of a variation of the power consumption at step S220. For example, even when the power consumption of the fan 132 for air conditioning or the compressor 134 for air conditioning is slightly varied, the variation of the power consumption does not immediately affect the vehicle interior temperature. Accordingly these auxiliary machines are unlikely to provide a feeling of strangeness to the driver in the case of a variation of the power consumption.

The foregoing describes some aspects of the disclosure with reference to some embodiments. The embodiments of the disclosure described above are provided only for the purpose of facilitating the understanding of the disclosure and not for the purpose of limiting the disclosure in any sense. The disclosure may be changed, modified and altered without departing from the scope of the disclosure and includes equivalents thereof.

The invention claimed is:

1. A power supply control apparatus of a vehicle, the vehicle comprising an engine; a DC-DC converter connected between high-voltage wiring and low-voltage wiring; a generator connected with the high-voltage wiring and configured to generate electric power by utilizing rotation of the engine; a high-voltage secondary battery connected with the high-voltage wiring via a relay; high-voltage auxiliary machinery connected with the high-voltage wiring; a low-voltage secondary battery connected with the low-voltage wiring; and low-voltage auxiliary machinery connected with the low-voltage wiring, wherein
   (i) in a first case where a total power consumption of the high-voltage auxiliary machinery and the low-voltage auxiliary machinery is greater than a first reference value in a state that the high-voltage secondary battery is disconnected from the high-voltage wiring by the relay, the power supply control apparatus then sets a lower value to a target control value of output voltage of the generator, compared with a case where the total power consumption is less than or equal to the first reference value; and
   (ii) in a second case where the total power consumption of the high-voltage auxiliary machinery and the low-voltage auxiliary machinery is less than a second reference value that is less than or equal to the first reference value in the state that the high-voltage secondary battery is disconnected from the high-voltage wiring by the relay, the power supply control apparatus then sets a higher value to the target control value of output voltage of the generator, compared with a case where the total power consumption is more than or equal to the second reference value.

2. The power supply control apparatus according to claim 1,
   (iii) in a third case where the total power consumption of the high-voltage auxiliary machinery and the low-voltage auxiliary machinery is between the second reference value and the first reference value, inclusive, in the state that the high-voltage secondary battery is disconnected from the high-voltage wiring by the relay, the power supply control apparatus then sets a middle value between the lower value in the first case and the higher value in the second case to the target control value of output voltage of the generator.

3. The power supply control apparatus according to claim 1, wherein
   (i) in the first case, the power supply control apparatus further sets a higher value to a target control value of voltage on a low-voltage wiring-side of the DC-DC converter, compared with the case where the total power consumption is less than or equal to the first reference value, and
   (ii) in the second case, the power supply control apparatus further sets a lower value to the target control value of voltage on the low-voltage wiring-side of the DC-DC converter, compared with the case where the total power consumption is more than or equal to the second reference value.

4. The power supply control apparatus according to claim 2, wherein
   (i) in the first case, the power supply control apparatus further sets a higher value to a target control value of voltage on a low-voltage wiring-side of the DC-DC converter, compared with the case where the total power consumption is less than or equal to the first reference value, and
   (ii) in the second case, the power supply control apparatus further sets a lower value to the target control value of voltage on the low-voltage wiring-side of the DC-DC converter, compared with the case where the total power consumption is more than or equal to the second reference value.

5. The power supply control apparatus according to claim 4, wherein
   (iii) in the third case, the power supply control apparatus further sets a middle value between the lower value in the first case and the higher value in the second case to the target control value of voltage on the low-voltage wiring-side of the DC-DC converter.

6. The power supply control apparatus according to claim 1,
   wherein the high-voltage auxiliary machinery includes a first auxiliary machine that is used for braking control of the vehicle and a second auxiliary machine that is not used for the braking control,
   when power consumption of the first auxiliary machine varies in the state that the high-voltage secondary battery is disconnected from the high-voltage wiring by the relay, the power supply control apparatus changes power consumption of the second auxiliary machine, in order to reduce a variation in sum of the power consumption of the first auxiliary machine and the power consumption of the second auxiliary machine.

7. A vehicle, comprising:
an engine;
a DC-DC converter connected between high-voltage wiring and low-voltage wiring;
a generator connected with the high-voltage wiring and configured to generate electric power by utilizing rotation of the engine;
a high-voltage secondary battery connected with the high-voltage wiring via a relay;
high-voltage auxiliary machinery connected with the high-voltage wiring;
a low-voltage secondary battery connected with the low-voltage wiring;
low-voltage auxiliary machinery connected with the low-voltage wiring; and
the power supply control apparatus according to claim 1.

8. A method of controlling a power supply in a vehicle, the vehicle comprising an engine; a DC-DC converter connected between high-voltage wiring and low-voltage wiring; a generator connected with the high-voltage wiring and configured to generate electric power by utilizing rotation of the engine; a high-voltage secondary battery connected with the high-voltage wiring via a relay; high-voltage auxiliary machinery connected with the high-voltage wiring; a low-voltage secondary battery connected with the low-voltage wiring; and low-voltage auxiliary machinery connected with the low-voltage wiring, the method comprising the steps of:
   (i) in a first case where a total power consumption of the high-voltage auxiliary machinery and the low-voltage auxiliary machinery is greater than a first reference value in a state that the high-voltage secondary battery is disconnected from the high-voltage wiring by the relay, then setting a lower value to a target control value of output voltage of the generator, compared with a case where the total power consumption is less than or equal to the first reference value; and
   (ii) in a second case where the total power consumption of the high-voltage auxiliary machinery and the low-voltage auxiliary machinery is less than a second reference value that is less than or equal to the first reference value in the state that the high-voltage secondary battery is disconnected from the high-voltage wiring by the relay, then setting a higher value to the target control value of output voltage of the generator, compared with a case where the total power consumption is more than or equal to the second reference value.

9. The method of controlling the power supply according to claim 8, the method further comprising the step of:
   (iii) in a third case where the total power consumption of the high-voltage auxiliary machinery and the low-voltage auxiliary machinery is between the second reference value and the first reference value, inclusive, in the state that the high-voltage secondary battery is disconnected from the high-voltage wiring by the relay then setting a middle value between the lower value in the first case and the higher value in the second case to the target control value of output voltage of the generator.

10. The method of controlling the power supply according to claim 8, wherein
   (i) in the first case, setting a higher value to a target control value of voltage on a low-voltage wiring-side of the DC-DC converter, compared with the case where the total power consumption is less than or equal to the first reference value, and
   (ii) in the second case, setting a lower value to the target control value of voltage on the low-voltage wiring-side of the DC-DC converter, compared with the case where the total power consumption is more than or equal to the second reference value.

11. The method of controlling the power supply according to claim 9, wherein
   (i) in the first case, setting a higher value to a target control value of voltage on a low-voltage wiring-side of the DC-DC converter, compared with the case where the total power consumption is less than or equal to the first reference value, and
   (ii) in the second case, setting a lower value to the target control value of voltage on the low-voltage wiring-side of the DC-DC converter, compared with the case where the total power consumption is more than or equal to the second reference value.

12. The method of controlling the power supply according to claim 11, wherein
   (iii) in the third case, setting a middle value between the lower value in the first case and the higher value in the second case to the target control value of voltage on the low-voltage wiring-side of the DC-DC converter.

13. The method of controlling the power supply according to claim 8,
wherein the high-voltage auxiliary machinery includes a first auxiliary machine that is used for braking control of the vehicle and a second auxiliary machine that is not used for the braking control,
the method further comprising the step of:
when power consumption of the first auxiliary machine varies in the state that the high-voltage secondary battery is disconnected from the high-voltage wiring by the relay, changing power consumption of the second auxiliary machine, in order to reduce a variation in sum of the power consumption of the first auxiliary machine and the power consumption of the second auxiliary machine.

* * * * *